(12) United States Patent
Wang et al.

(10) Patent No.: US 11,936,541 B2
(45) Date of Patent: Mar. 19, 2024

(54) METHOD AND APPARATUS FOR PREDICTION OF DEVICE FAILURE

(71) Applicant: Telefonaktiebolaget LM Ericsson (publ), Stockholm (SE)

(72) Inventors: Minyi Wang, Guangdong (CN); Jingrui Tao, Guangdong (CN); Yun Zhang, Beijing (CN); Fengpei Zhang, Guangdong (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 170 days.

(21) Appl. No.: 17/288,157

(22) PCT Filed: Nov. 2, 2018

(86) PCT No.: PCT/CN2018/113738
§ 371 (c)(1),
(2) Date: Apr. 23, 2021

(87) PCT Pub. No.: WO2020/087513
PCT Pub. Date: May 7, 2020

(65) Prior Publication Data
US 2022/0006714 A1 Jan. 6, 2022

(51) Int. Cl.
*H04L 43/065* (2022.01)
*H04L 41/147* (2022.01)
*H04L 43/0817* (2022.01)
*H04L 69/40* (2022.01)
*H04W 52/02* (2009.01)

(52) U.S. Cl.
CPC .......... *H04L 43/065* (2013.01); *H04L 41/147* (2013.01); *H04L 43/0817* (2013.01);
(Continued)

(58) Field of Classification Search
None
See application file for complete search history.

(56) References Cited

U.S. PATENT DOCUMENTS

2007/0143552 A1* 6/2007 Rastogi ............... H04L 63/1458
 711/154
2016/0277243 A1 9/2016 Kim et al.
(Continued)

FOREIGN PATENT DOCUMENTS

CN 101472220 A 7/2009
CN 104105051 A 10/2014
(Continued)

OTHER PUBLICATIONS

OMA LightweightM2M (LwM2M) Object and Resource Registry, Open Mobile Alliance-LwM2M Registry, Aug. 8, 2018, consisting of 38-pages.
(Continued)

*Primary Examiner* — Atta Khan
(74) *Attorney, Agent, or Firm* — Christopher & Weisberg, P.A.

(57) ABSTRACT

Various embodiments of the present disclosure provide a method for prediction of device failure. The method includes receiving from a network exposure node a request for subscribing to a monitoring report related to a device failure predicted for a terminal device; obtaining, in response to the request, traffic data and current power consumption data of the terminal device; detecting, based on the traffic data, a traffic anomaly of the terminal device; predicting, in response to the detection of the traffic anomaly of the terminal device, a device failure based on the current power consumption data; and transmitting the monitoring report indicating the predicted device failure to the network exposure node. According to the embodiments of the present disclosure, the monitoring event can be extended to predict the device failure of the terminal device.

14 Claims, 6 Drawing Sheets

(52) U.S. Cl.
CPC ......... *H04L 69/40* (2013.01); *H04W 52/0254* (2013.01); *H04W 52/0258* (2013.01); *H04W 52/0261* (2013.01)

(56) References Cited

U.S. PATENT DOCUMENTS

| | | | |
|---|---|---|---|
| 2017/0118667 A1* | 4/2017 | Mattsson | ................. H04W 8/10 |
| 2017/0284903 A1 | 10/2017 | Anderson et al. | |
| 2019/0004118 A1* | 1/2019 | Eichelberger | ........ G01R 31/382 |
| 2021/0051497 A1* | 2/2021 | Xu | ........................ H04W 24/10 |

FOREIGN PATENT DOCUMENTS

| | | |
|---|---|---|
| WO | 2016180961 A1 | 11/2016 |
| WO | 2018141847 A1 | 8/2018 |
| WO | 2018175378 A1 | 9/2018 |
| WO | 2020066890 A1 | 4/2020 |

OTHER PUBLICATIONS

EPO Communication with Supplementary European Search Report dated Jun. 9, 2022 for Patent Application No. 18938471.2, consisting of 7-pages.

International Search Report and Written Opinion dated Jul. 31, 2019 for International Application No. PCT/CN2018/113738 filed Nov. 2, 2018, consisting of 9-pages.

3GPP TS 23.682 V15.2.0; 3rd Generation Partnership Project; Technical Specification Group Services and System Aspects; Architecture enhancements to facilitate communications with packet data networks and applications (Release 15), Sep. 2017, consisting of 122-pages.

3GPP TS 29.122 V0.4.0; 3rd Generation Partnership Project; Technical Specification Group Core Network Terminals; T8 reference point for northbound APIs (Release 15), Dec. 2017, consisting of 106-pages.

ETSI TS 123 682 V15.6.0; Digital cellular telecommunications system (Phaase 2+) (GSM); Universal Mobile Telecommunications System (UMTS); LTE; Architecture enhancements to facilitate communications with packet data networks and applications (3GPP TS 23.682 version 15.6.0 Release 15), Sep. 2018, consisting of 126-pages.

ETSI TS 129 122 V15.1.0; Universal Mobile Telecommunications System (UMTS); LTE; 5G; T8 reference point for Northbound APIs (3GPP TS 29.122 version 15.1.0 Release 15).

EPO Communication dated Dec. 1, 2023 for Patent Application No. 18938471.2, consisting of 8-pages.

* cited by examiner

METHOD AND APPARATUS FOR PREDICTION OF DEVICE FAILURE

CROSS-REFERENCE TO RELATED APPLICATIONS

This application is a Submission Under 35 U.S.C. § 371 for U.S. National Stage Patent Application of International Application Number: PCT/CN2018/113738, filed Nov. 2, 2018 entitled "METHOD AND APPARATUS FOR PREDICTION OF DEVICE FAILURE," the entirety of which is incorporated herein by reference.

FIELD OF THE INVENTION

The present disclosure generally relates to communication networks, and more specifically, to prediction of device failure of a terminal device.

BACKGROUND

This section introduces aspects that may facilitate a better understanding of the disclosure. Accordingly, the statements of this section are to be read in this light and are not to be understood as admissions about what is in the prior art or what is not in the prior art.

Network Exposure Function (NEF) in the 5th Generation (5G) communication technology, or its equivalent functional entity in the 4G communication technology, service capability exposure function (SCEF) is a key entity within 3rd generation partnership project (3GPP) architecture for service capability exposure. SCEF/NEF can provide means to securely expose service capabilities provided by 3GPP network interfaces through application programming interfaces (APIs) to an application server. Generally, the exposed service capabilities may be in the form of monitoring events (MONTEs). They are intended for monitoring specific events in 3GPP systems and making the event information available through SCEF/NEF.

3GPP has defined some event types of monitoring events such as user equipment (UE) reachability, loss of connectivity, location of UE, communication failure, number of UEs present in a geographical area, availability after downlink data notification (DDN) failure, change of international mobile subscriber identification number (IMSI)-international mobile equipment identity (IMEI) software version (SV) association, and roaming status. These monitoring events may be detected from 3GPP network functions, e.g. home subscriber server (HSS) or unified data management (UDM) function, mobility management entity (MME) or access and mobility management function (AMF), or policy and charging rules function (PCRF), etc.

Figure 1:
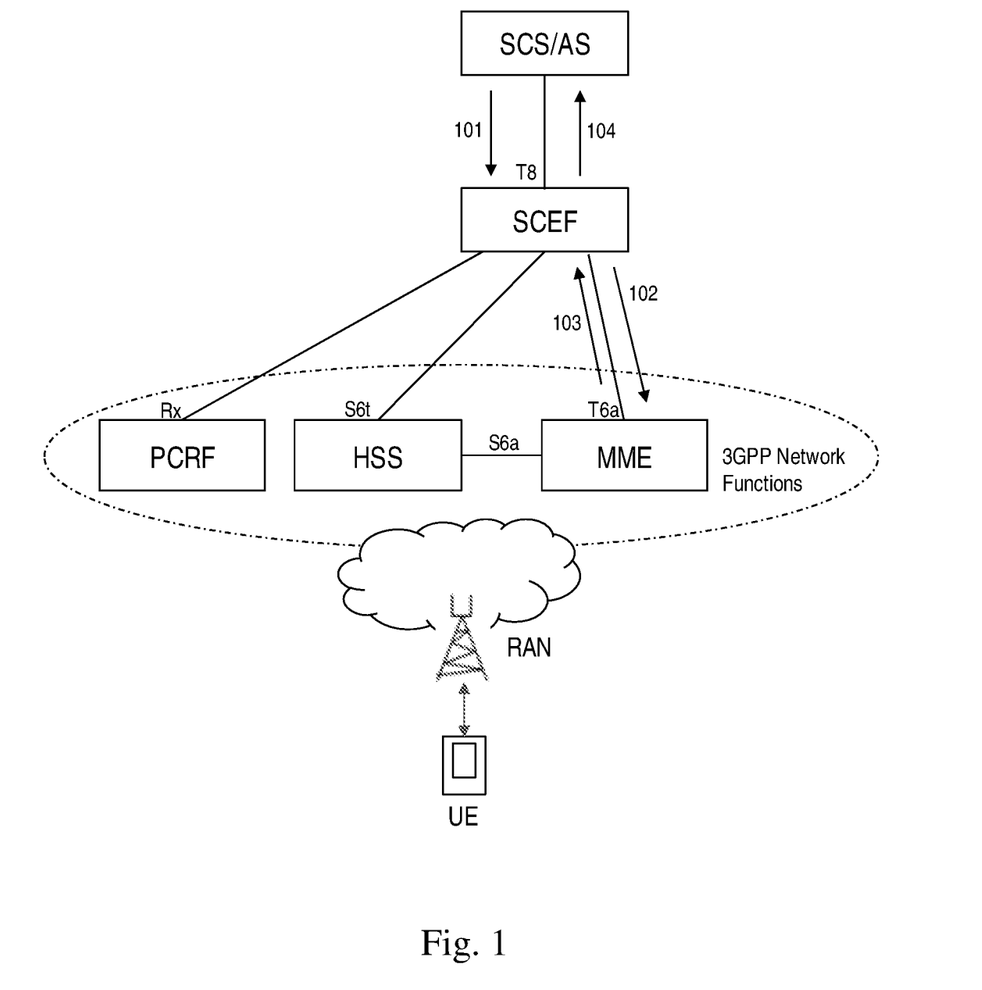
FIG. 1 is a diagram showing an existing architecture for service capability exposure.

For example, 3GPP technical specification (TS) 23.682 15.6.0 defines a procedure about how SCEF exposes monitoring event functions of the 3GPP network functions such as HSS, MME or PCRF. The defined procedure is illustrated in FIG. 1. At 101, a service capability server (SCS) or an application server (AS) sends a monitoring request to SCEF. At 102, SCEF handles and routes the monitoring request to a related network function such as HSS or MME or PCRF. At 103, HSS or MME or PCRF responds with a monitoring indication. At 104, SCEF sends a monitoring response to SCS or AS.

In addition, for a machine-to-machine (M2M) network or an Internet-of-things (IoT) network, Open Mobile Alliance (OMA) provides a device management protocol LightweightM2M (LwM2M). There can exist a standard object and resource model defined from LwM2M in SCS or AS. The object and resource model can describe data objects related to device management. Device management function may handle device status information (e.g. a battery level) reported from terminal devices and described via the object and resource model.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution of predicting a device failure of a terminal device, so as to improve the service capability exposure.

According to a first aspect of the present disclosure, there is provided a method performed by a network exposure node. The method comprises receiving, from a server, a request for subscribing to a monitoring report related to a device failure predicted for a terminal device that can be enabled by an operator node. The method further comprises transmitting a monitoring request for subscribing to the monitoring report to the operator node and receiving the monitoring report indicating a predicted device failure for the terminal device from the operator node. And the method further comprises transmitting the monitoring report to the server.

In accordance with an exemplary embodiment, the request may comprise a data structure "MonitoringEventSubscription" having an attribute "monitoringType" set to "predictedDeviceFailure". The monitoring report may comprise a data structure "MonitoringEventNotification" having a parameter "predictedDeviceFailure" in a data type "monitoringEventReports". The parameter "predictedDeviceFailure" may be set to the predicted device failure.

In accordance with an exemplary embodiment, the device failure may comprise one of battery anomaly, out-of-battery, and hardware failure.

In accordance with an exemplary embodiment, the terminal device may be one of: a low power wide area (LPWA) device, a narrowband Internet of things (NB-IoT) device, and a category-M1 (CAT-M1) device.

With the method according to the first aspect of the present disclosure, the monitoring for the terminal device can be extended to predict the device failure of the terminal device. Thus upper applications in the server can know the device failure of the terminal device, which helps the upper applications to take appropriate actions.

According to a second aspect of the present disclosure, there is provided a method performed by an operator node. The method comprises receiving, from a network exposure node, a request for subscribing to a monitoring report related to a device failure predicted for a terminal device. The method also comprises obtaining traffic data and current power consumption data of a terminal device, detecting, based on the traffic data, a traffic anomaly of the terminal device, and predicting, in response to the detection of the traffic anomaly of the terminal device, a device failure based on the current power consumption data. The method further comprises transmitting the monitoring report indicating the predicted device failure to the network exposure node.

In accordance with an exemplary embodiment, detecting a traffic anomaly of the terminal device may comprise checking, based on the traffic data, whether the terminal device operates in a normal traffic pattern, and determining, in response to the terminal device not operating in the normal traffic pattern, the traffic anomaly of the terminal device.

In accordance with an exemplary embodiment, the normal traffic pattern may be generated by means of machine learning based on historical traffic data of a plurality of reference terminal devices which have the same device type as the terminal device.

In accordance with an exemplary embodiment, the traffic data may comprise first traffic data for mobile originated messages, second traffic data for mobile terminated messages, and third traffic data for monitoring event notifications related to network functions.

In accordance with an exemplary embodiment, predicting a device failure based on the current power consumption data may comprise: determining, based on a prediction model for battery level and the current power consumption data, a predicted battery level for the terminal device; determining, in response to the predicted battery level being lower than a battery level threshold, that the terminal device is out-of-battery; determining, in response to current battery level in the current power consumption data being lower than the predicted battery level and a difference between the predicted battery level and the current battery level being greater than a predetermined threshold, that the terminal device has a battery anomaly; and determining, otherwise, that the terminal device has a hardware failure.

In accordance with an exemplary embodiment, the prediction model for battery level may be established by means of machine learning based on historical power consumption data of a plurality of reference terminal devices which have the same device type as the terminal device.

In accordance with an exemplary embodiment, predicting a device failure based on the current power consumption data may further comprise: prior to determining the predicted battery level, obtaining historical power consumption data of the terminal device, and modifying the prediction model based on the historical power consumption data of the terminal device. Moreover, the modified prediction model is used to determine the predicted battery level.

In accordance with an exemplary embodiment, the power consumption data may comprise a battery level, device usage time, and a device behavior pattern.

In accordance with an exemplary embodiment, the device behavior pattern may comprise at least one of: a current value in the predetermined time period, an amount of messages in the predetermined time period, and an amount of events in the predetermined time period.

According to a third aspect of the present disclosure, there is provided a network exposure node. The network exposure node may comprise one or more processors and one or more memories comprising computer program codes. The one or more memories and the computer program codes may be configured to, with the one or more processors, cause the network exposure node at least to perform any step of the method according to the first aspect of the present disclosure.

According to a fourth aspect of the present disclosure, there is provided a computer-readable medium having computer program codes embodied thereon which, when executed on a computer, cause the computer to perform any step of the method according to the first aspect of the present disclosure.

According to a fifth aspect of the present disclosure, there is provided an operator node. The operator node may comprise one or more processors and one or more memories comprising computer program codes. The one or more memories and the computer program codes may be configured to, with the one or more processors, cause the operator at least to perform any step of the method according to the second aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as 5G, 4G, wideband code division multiple access (WCDMA), high-speed packet access (HSPA), and so on.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like. In the following description, terms "terminal device" and "UE" may be used interchangeably.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned above, the current monitoring event solution is based on 3GPP network function capabilities exposed by SCEF, and most event types are related to the 3GPP network function (such as HSS or MME or PCRF) capabilities. However, if the 3GPP network function or terminal device cannot be aware of some events or failures, SCS or AS cannot get any indication.

For example, for the terminal device such as a low power wide area (LPWA) device, a NB-IoT device, a category-M1 (CAT-M1) device, SCS or AS may need to maintain or change the terminal device when it is damaged or out of battery. But in standard T6a/T8 interfaces as shown in FIG. 1, only battery level of the terminal device is defined in a monitoring event. Moreover, for the LwM2M data objects, all event types shall be detected and reported directly from the terminal device or 3GPP network functions. Therefore, if the terminal device is out of battery or damaged, the terminal device or 3GPP network functions cannot report relevant events. Thus, it will increase complexity of applications in SCS or AS to trace and analyze the terminal device.

Therefore, it is desirable to detect and report such device failures as the out-of-battery or damage of the terminal device.

The present disclosure provides a solution to predict a device failure of the terminal device. Hereinafter, the solution will be described in detail with reference to FIGS. 2-7.

It is noted that some embodiments of the present disclosure are mainly described in relation to 4G or 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 2:
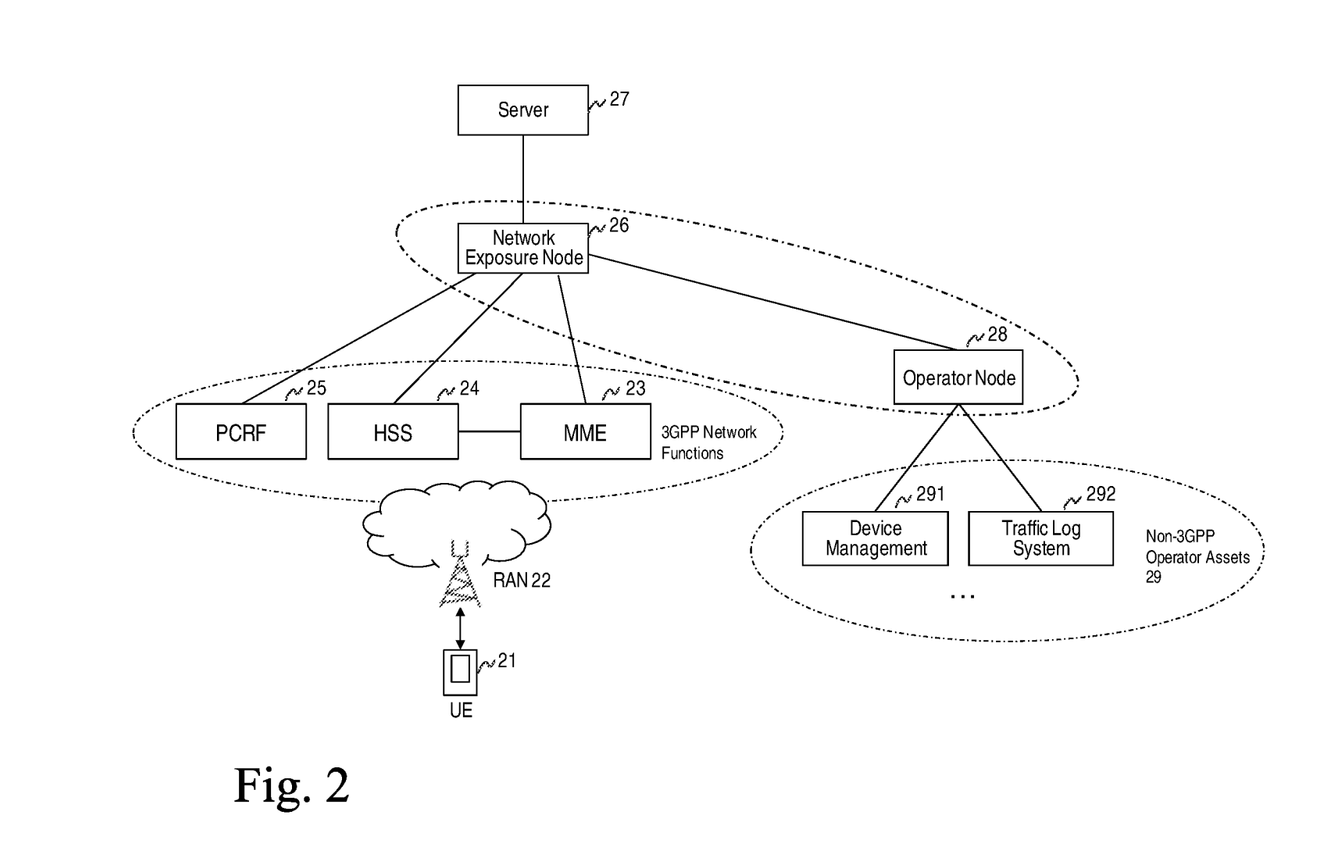
FIG. 2 is a diagram showing an exemplary wireless communication system according to some embodiment of the disclosure.

FIG. 2 is a diagram showing an exemplary wireless communication system according to an embodiment of the disclosure. As shown, the wireless communication system comprises a terminal device 21, a radio access network (RAN) 22, a mobility management entity (e.g. MME in 4G networks, or AMF in 5G networks) 23, a user data management entity (e.g. HSS 24 in 4G networks, or UDM in 5G networks), a policy and charging rules function (PCRF) 25, a network exposure node 26, a server 27, an operator node 28 and non-3GPP operator assets 29.

The terminal device 21 can communicate through a radio access communication link with the RAN 22. The communication may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. In some embodiments of the present disclosure, the terminal device 21 may be a LPWA device, a NB-IoT device, or a CAT-M1 device.

The RAN 22 may include, for example, a universal mobile telecommunications system (UMTS) terrestrial RAN (UTRAN), a global system for mobile communication (GSM)/enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs) that can provide the combined functionality of the RNC nodes and base stations of the UTRAN and the GERAN.

The MME 23, the HSS 24 and the PCRF 25 are core network nodes mainly involved in the service capability exposure of 3GPP network functions. The MME 23 can carry out mobility management of the terminal device 21. The HSS 24 can manage subscriber information of the terminal device 21. The PCRF 25 can determine a policy and charging control (PCC) rule to be applied to a service data flow of the terminal device 21. Note that these core network nodes are merely illustrative but not limited.

The network exposure node 26 can expose both the capabilities of the 3GPP network functions (e.g. the MME 23, the HSS 24, and the PCRF 25) and the capabilities or their derivatives of the non-3GPP operator assets 29, by providing access to the network functions and capabilities through homogenous interfaces. In some embodiments of the present disclosure, the network exposure node 26 may be a service capability exposure function (SCEF) in 4G networks or a network exposure function (NEF) in 5G networks. The homogenous interfaces may be network application programming interfaces (APIs) defined by open mobile alliance (OMA), GSM alliance (GSMA) and possibly other standardization bodies.

The server 27 can access both the 3GPP network functions and the capabilities or their derivatives of the non-3GPP operator assets 29 through the homogenous interfaces between the network exposure node 26 and the server 27. In some embodiments of the present disclosure, the server 27 may be a service capability server (SCS) or an application server (AS) defined by 3GPP, or any other similar entity.

The operator node 28 can enable monitoring event(s) based at least on the capability of one or more of the non-3GPP operator assets 29, such that the capability or the derivative(s) thereof can be exposed by the network exposure node 26. Thus, the operator node 28 may also be called as monitoring event (MONTE) enabler. The non-3GPP operator assets 29 refer to the operator assets which are not defined by 3GPP. In some embodiments of the present disclosure, as shown in FIG. 2, the non-3GPP operator assets 29 may comprise a device management system 291 and a traffic log system 292. Moreover, the non-3GPP operator assets 29 may also include a mobile location based system, a business or operation supporting system, and any other existing or future developed operator assets.

Figure 3:
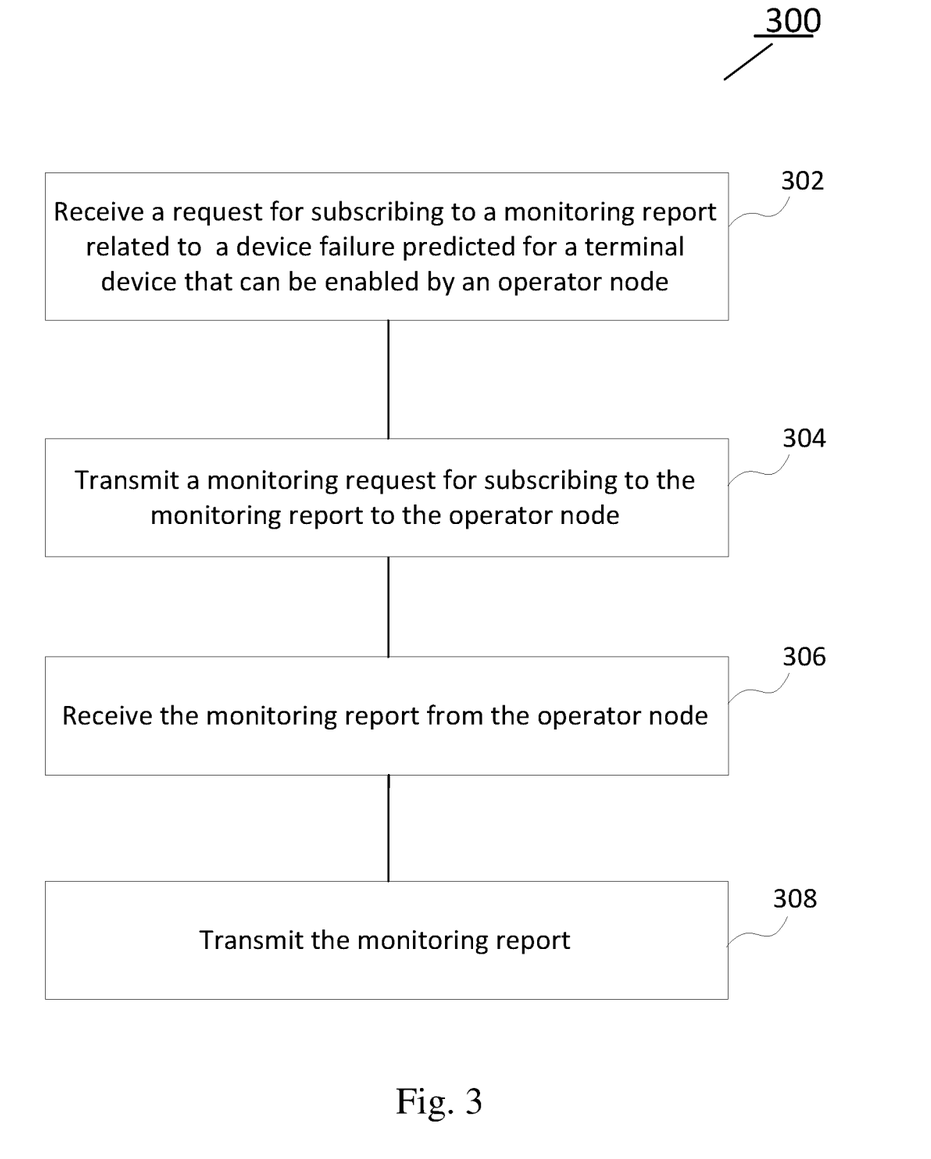
FIG. 3 is a flowchart illustrating a method performed by a network exposure node according to some embodiment of the disclosure.

FIG. 3 is a flowchart illustrating a method 300 according to some embodiments of the present disclosure. The method 300 illustrated in FIG. 3 may be performed by a network exposure node. In accordance with an exemplary embodiment, the network exposure node may be, for example, SCEF or NEF.

According to the exemplary method 300 illustrated in FIG. 3, the network exposure node may receive from a server a request for subscribing to a monitoring report related to a device failure predicted for a terminal device that can be enabled by an operator node, as shown in block 302. In some embodiments, the server may be a SCS or AS, and the terminal device may be a LPWA device, a NB-IoT device, or a CAT-M1 device. The request may comprise identification information of the terminal device and a type of the monitoring report. The identification information of the terminal device may include, but not limited to, a mobile subscriber international integrated service digital network number (MSISDN), an external identifier (e.g. device ID) or the like. The type of the monitoring report may indicate an event type to be monitored for the terminal device. In this embodiment, the type of the monitoring report indicates predicting the device failure of the terminal device.

In the embodiment, the monitoring report is related to the device failure predicted for the terminal device. As used herein, the term "device failure" means a scenario where the device is out of battery or a scenario where the device is anomalous. Thus, in some embodiments, the device failure may comprise out-of-battery, battery anomaly, and hardware failure.

In the case where the network exposure node is SCEF, the SCEF communicates with the server via T8 interface. As defined in 3GPP TS 29.122 v 15.1.0, T8 interface is a set of SCEF northbound APIs. One of the APIs is "MonitoringEventSubscription" which has an input parameter "monitoringType". In the embodiment, a new value "predictedDeviceFailure" may be added for the input parameter "monitoringType" to indicate predicting a device failure for a terminal device. Thus, the request may be implemented as a message comprising a data structure "MonitoringEventSubscription" having an attribute "monitoringType" set to "predictedDeviceFailure".

Then in response to the request from the server, the network exposure node may obtain the monitoring report from the operator node. In some embodiments, at block 304, the network exposure node may transmit a monitoring request for subscribing to the monitoring report to the operator node, in response to receiving the request from the server. In some embodiment, the monitoring request may be same as the received request. Additionally, in an embodiment, the network exposure node may retrieve, based on the identification information in the received request, from the HSS further information, and include the further information in the monitoring request in addition to the identification information and the type of the monitoring report in the received request. Then the network exposure node may receive the monitoring report from the operator node, as show in block 306. The monitoring report indicates the predicted device failure for the terminal device.

At block 308, the network exposure node may transmit the monitoring report to the server. In the case of SCEF, one of the SCEF northbound APIs is "MonitoringEventNotification" which has a data type "monitoringEventReports". In some embodiments, a new parameter "predictedDeviceFailure" may be added to the data type "monitoringEventReports". The new parameter "predictedDeviceFailure" may be set to the predicted device failure. In an embodiment, the parameter "predictedDeviceFailure" may have four values: 0 represents no device failure, 1 represents out-of-battery, 2 represents battery anomaly, and 3 represents hardware failure. Thus the monitoring report may be implemented as a message comprising a data structure "MonitoringEventNotification" having a parameter "predictedDeviceFailure" in the data type "monitoringEventReports".

It can be therefore seen that, with the method according to some embodiments of the present disclosure as described with reference to FIG. 3, the monitoring event can be extended to predict the device failure of the terminal device and to allow the server to know the device failure.

Figure 4:
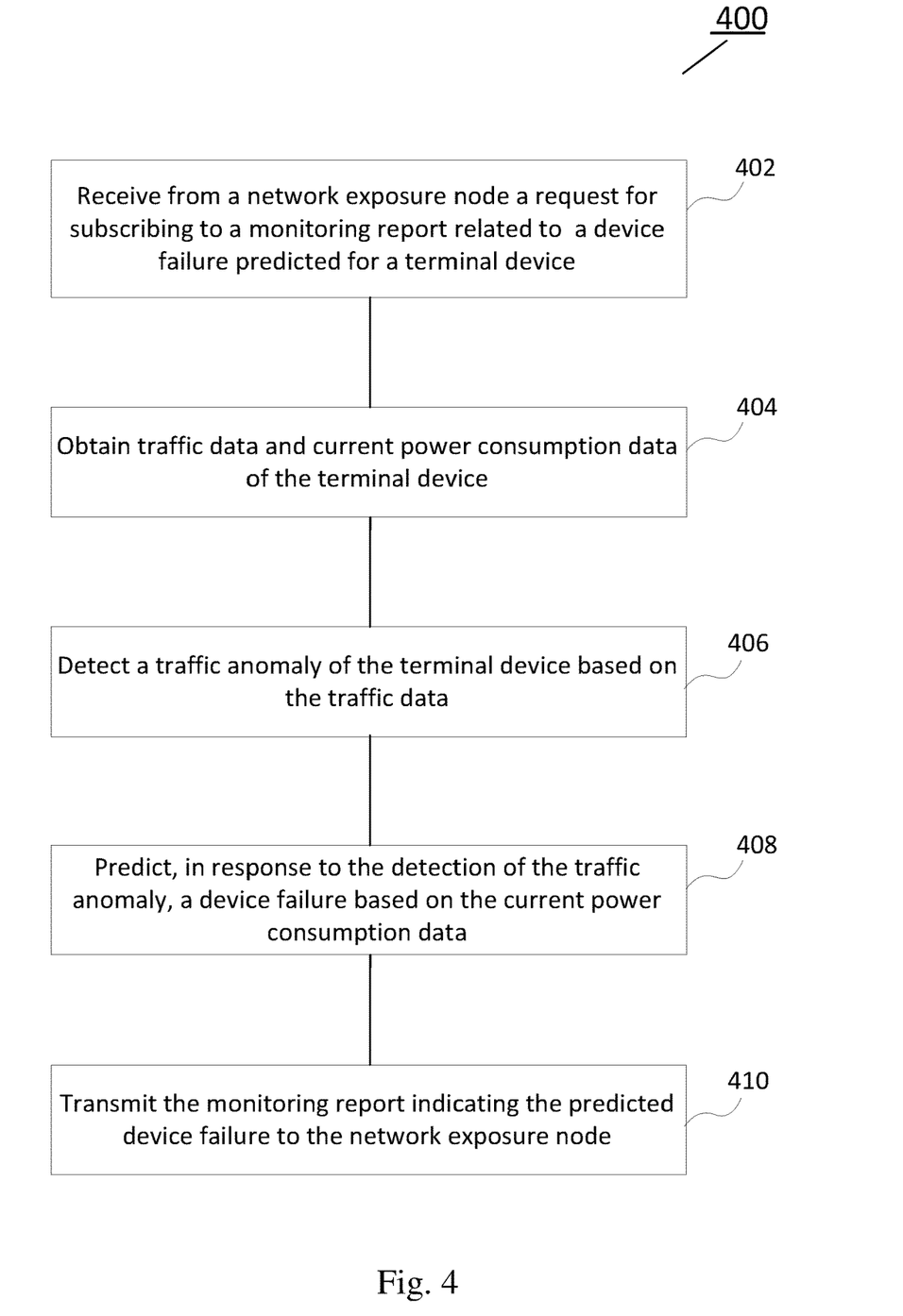
FIG. 4 is a flowchart illustrating another method performed by an operator node according to some embodiment of the present disclosure.

FIG. 4 shows a flowchart illustrating another method 400 performed by an operator node according to some embodiments of the present disclosure. As shown, at block 402, the operator node may receive from a network exposure node a request for subscribing to a monitoring report related to a device failure predicted for a terminal device. In some embodiments, the server may be a SCS or AS, and the terminal device may be a LPWA device, a NB-IoT device, or a CAT-M1 device. As described above, the request may comprise the identification information of the terminal device and the type of the monitoring report. In this embodiment, the type of the monitoring report indicates predicting a device failure of the terminal device.

At block 404, in response to the request, the operator node may obtain traffic data and current power consumption data of the terminal device identified in the request. As used herein, the term "traffic data" means data related to communication transactions with respect to a terminal device. In some embodiments, the traffic data may comprise, but not limited to, first traffic data for mobile originated messages, second traffic data for mobile terminated messages, and third traffic data for monitoring event notifications related to network functions such as MME, HSS, or PCRF. For example, the first traffic data may comprise a transmission interval or a transmission frequency for the mobile originated message. The second traffic data may comprise an amount of undelivered mobile terminated message. The third traffic data may comprise a transmission interval or transmission frequency for a certain monitoring event notification. In some embodiments, the traffic data may be obtained from the traffic log system. The traffic log system can record traffic logs for terminal devices and network functions. For example, the traffic log system can process the traffic log of the terminal device to generate the first traffic data and the second traffic data. The traffic log system can also process the traffic logs of the network functions to generate the third traffic data.

Moreover, the term "power consumption data" means data related to power consumption of a terminal device. In some embodiments, the power consumption data may comprise a battery level, device usage time, and a device behavior pattern. The battery level may be obtained from the device management system. For example, the device management system may be an LwM2M server. The terminal device may periodically update an LwM2M data object "BatteryLevel" to the LwM2M server. The device usage time may be obtained from the traffic log system. For example, the traffic log system may process the traffic log of the terminal device to determine the device usage time of the terminal device. In addition, the power consumption of the terminal device may include power consumption on radio (e.g. radio signal strength, operation mode such as power saving mode (PSM) or extended Discontinuous Reception (eDRX) mode) and power consumption on applications (e.g. communication interval, message number, packet size). Therefore, the device behavior pattern may comprise one or more of: a current value in the predetermined time period, an amount of messages in the predetermined time period, and an amount of events in the predetermined time period. The device behavior pattern may be obtained from the traffic log system. For example, the traffic log system may process the traffic log of the terminal device in real time to determine the device behavior pattern.

At block 406, the operator node may detect a traffic anomaly of the terminal device based on the obtained traffic data of the terminal device. In some embodiments, the operator node may check whether the terminal device operates in a normal traffic pattern, based on the traffic data. In response to the terminal device not operating in the normal traffic pattern, the operate node determines that the terminal device has the traffic anomaly. Otherwise, the operator node determines that the terminal device operates normally, and the method 400 ends. In an embodiment, the normal traffic pattern may be generated in advance. The operator node may obtain historical traffic data of a plurality of reference terminal devices. These reference terminal devices have the same or similar device type as the terminal device. As used herein, the term "device type" means a type of terminal device. For example, if the terminal device is a specific physical instance of a smart meter, the reference terminal device may be the same physical instance of the smart meter or a smart meter having a general device model. Then the operator node may generate the normal traffic pattern from the historical traffic data using a machine learning algorithm. The machine learning algorithm can be based on neural network. Thus, the normal traffic pattern is specific to a device type of terminal device.

In response to the detection of the traffic anomaly at block 406, the operator node may predict the device failure based on the obtained current power consumption data, at block 408. As described above, the device failure may comprise out-of-battery, battery anomaly or hardware failure.

In some embodiment, the operator node may determine a predicted battery level based on a prediction model for battery level and current power consumption data. The prediction model for battery level is device type specific and can be established in advance. The input of the predication model is the device usage time and the device behavior pattern in the power consumption data, and the output is the battery level. In an embodiment, the operator node may obtain historical power consumption data of the reference terminal devices, and then use the device usage time and the device behavior pattern as the input and the battery level as the output to train the prediction model. A machine learning algorithm can be used to train the prediction model. For example, the machine learning algorithm may be based on linear regression or neural network. After the prediction model is established, the operator node can input the device usage time and the device behavior pattern of the terminal device to the prediction model to predict the battery level.

Additionally, in an embodiment, the operator node may obtain historical power consumption data of the terminal device, and then use the historical power consumption data to modify the prediction model. In this way, the power consumption trend of the terminal device can be taken into account to update the prediction model to be more precise for this terminal device. Thus the prediction for battery level can be improved. Then the operator node can use the modified prediction model to predict the battery level.

Then the operator node may check whether the predicted battery level is lower than a battery level threshold which is close to zero. If the predicted battery level is lower than the battery level, it indicates that the terminal device will be out of battery soon. Thus the operator node determines that the terminal device is out-of-battery.

If the predicted battery level is higher than the battery level threshold, the operator node may compare the predicted battery level and the current battery level in the current power consumption data. If the current battery level is lower than the predicted battery level, the operator node may compute the difference between the predicted battery level and the current battery level. If the difference is greater than a predetermined threshold, it indicates there is a significant drop of the battery level in the terminal device. In this case, it is high probability that the battery of the terminal device is anomalous. Therefore, the operator node may determine that that the terminal device has a battery anomaly. Otherwise, the operator node may determine that the terminal device has a hardware failure.

At block 410, the operator node may transmit the monitoring report indicating the predicted device failure to the network exposure node. As described above, the monitoring report may comprise a parameter "predictedDeviceFailure" which has different values for indicating the device failure.

It can be therefore seen that, with the method according to some embodiments of the present disclosure as described with reference to FIG. 4, the device failure of the terminal device can be predicted and reported to the network exposure node and upper applications. This helps the upper applications to take appropriate actions.

The various blocks shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
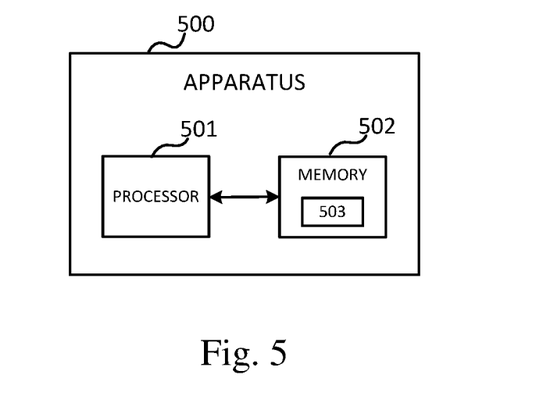
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a network exposure node as described with respect to FIG. 3, or an operator node as described with respect to FIG. 4.

In some implementations, the one or more memories 502 and the computer program codes 503 may be configured to, with the one or more processors 501, cause the apparatus 500 at least to perform any operation of the method as described in connection with FIG. 3. In such embodiments, the apparatus 500 may be implemented as at least part of or communicatively coupled to the network exposure node as described above. As a particular example, the apparatus 500 may be implemented as a network exposure node.

In other implementations, the one or more memories 502 and the computer program codes 503 may be configured to, with the one or more processors 501, cause the apparatus 500 at least to perform any operation of the method as described in connection with FIG. 4. In such embodiments, the apparatus 500 may be implemented as at least part of or communicatively coupled to the operator node as described above. As a particular example, the apparatus 500 may be implemented as an operator node.

Alternatively or additionally, the one or more memories 502 and the computer program codes 503 may be configured to, with the one or more processors 401, cause the apparatus 500 at least to perform more or less operations to implement the proposed methods according to the exemplary embodiments of the present disclosure.

Figure 6:
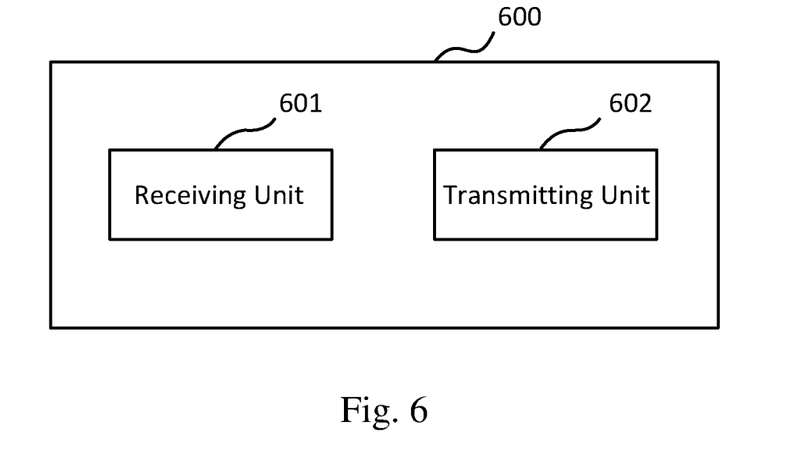
FIG. 6 is a block diagram illustrating a network exposure node according to some embodiment of the disclosure.

FIG. 6 is a block diagram illustrating a network exposure node 600 according to some embodiments of the present disclosure. As shown in FIG. 6, the network exposure node 600 may comprise a receiving unit 601 and a transmitting unit 602. The receiving unit 601 may be operable to receive from a server a request for subscribing to a monitoring report related to a device failure predicted for a terminal device that can be enabled by an operator node, as described above with respect to block 302. The transmitting unit 602 may be operable to transmit a monitoring request for subscribing to the monitoring report to the operator node, as described above with respect to block 304. The receiving unit 601 may be further operable to receive the monitoring report indicating a predicted device failure for the terminal device from the operator node, as described above with respect to block 306. The transmitting unit 602 may be further operable to transmit the monitoring report to the server, as described above with respect to block 308. Optionally, the receiving unit 601 and/or the transmitting unit 602 may be operable to carry out more or less operations to implement the proposed methods according to the exemplary embodiments of the present disclosure.

Figure 7:
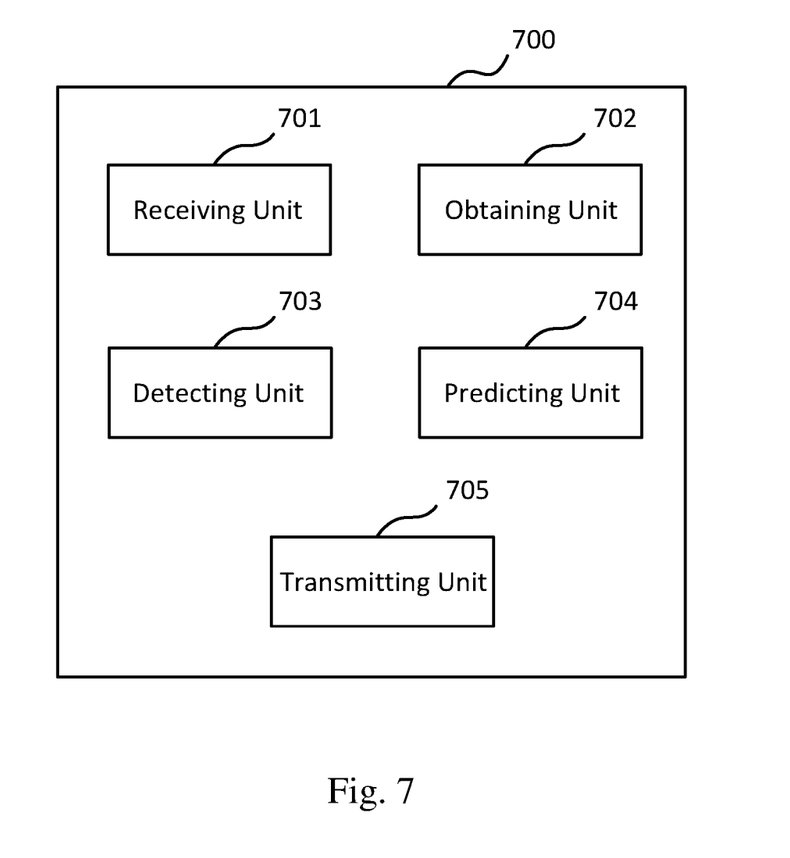
FIG. 7 is a block diagram illustrating an operator node according to some embodiments of the present disclosure.

FIG. 7 is a block diagram illustrating an operator node 700 according to some embodiments of the present disclosure. As shown in FIG. 7, the operator node 700 may comprise a receiving unit 701, an obtaining unit 702, a detecting unit 703, a predicting unit 704, and a transmitting unit 705. The receiving unit 701 may be operable to receive from a network exposure node a request for subscribing to a monitoring report related to a device failure predicted for a terminal device, as described above with respect to block 402. The obtaining unit 702 may be operable to obtain, in response to the request, traffic data and current power consumption data of the terminal device, as described above with respect to block 404. The detecting unit 703 may be operable to detect, based on the traffic data, a traffic anomaly of the terminal device, as described above with respect to block 406. The predicting unit 704 may be operable to predict, in response to the detection of the traffic anomaly of the terminal device, a device failure based on the current power consumption data, as described above with respect to block 408. The transmitting unit 705 may be operable to transmit the monitoring report indicating the predicted device failure to the network exposure node, as described above with respect to block 410. Optionally, the receiving unit 701 and/or the obtaining unit 702 and/or the detecting unit 703 and/or the predicting unit 704 and/or the transmitting unit 705 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a network exposure node, the method comprising:
   receiving, from a server, a request for subscribing to a monitoring report related to a device failure predicted for a terminal device that can be enabled by an operator node, the terminal device one of: a low power wide area (LPWA) device and a category-M1 (CAT-M1) device, the device failure comprising one of a battery anomaly, out-of-battery, and hardware failure, the request comprising a data structure "MonitoringEventSubscription" having an attribute "monitoringType" set to "predictedDeviceFailure", and the monitoring report comprising a data structure "MonitoringEventNotification" having a parameter "predictedDeviceFailure" in a data type "monitoringEventReports", the parameter "predictedDeviceFailure" being set to the predicted device failure;
   transmitting a monitoring request for subscribing to the monitoring report to the operator node;
   receiving the monitoring report indicating a predicted device failure for the terminal device from the operator node; and
   transmitting the monitoring report to the server.

2. A method performed by an operator node, the method comprising:
   receiving, from a network exposure node, a request for subscribing to a monitoring report related to a device failure predicted for a terminal device, the terminal device one of: a low power wide area (LPWA) device and a category-M1 (CAT-M1) device, the device failure comprising one of a battery anomaly, out-of-battery, and hardware failure, the request comprising a data structure "MonitoringEventSubscription" having an attribute "monitoringType" set to "predictedDeviceFailure", and the monitoring report comprising a data structure "MonitoringEventNotification" having a parameter "predictedDeviceFailure" in a data type "monitoringEventReports", the parameter "predictedDeviceFailure" being set to the predicted device failure;
   obtaining, in response to the request, traffic data and current power consumption data of the terminal device;
   detecting, based on the traffic data, a traffic anomaly of the terminal device;
   predicting, in response to the detection of the traffic anomaly of the terminal device, a device failure based on the current power consumption data; and
   transmitting the monitoring report indicating the predicted device failure to the network exposure node.

3. The method according to claim 2, wherein detecting a traffic anomaly of the terminal device comprises:
   checking, based on the traffic data, whether the terminal device operates in a normal traffic pattern; and
   determining, in response to the terminal device not operating in the normal traffic pattern, the traffic anomaly of the terminal device.

4. The method according to claim 3, wherein the normal traffic pattern is generated by means of machine learning based on historical traffic data of a plurality of reference terminal devices which have the same device type as the terminal device.

5. The method according to claim 3, wherein the traffic data comprises first traffic data for mobile originated messages, second traffic data for mobile terminated messages, and third traffic data for monitoring event notifications related to network functions.

6. The method according to claim 2, wherein predicting a device failure based on the current power consumption data comprises:
   determining, based on a prediction model for battery level and the current power consumption data, a predicted battery level for the terminal device;
   determining, in response to the predicted battery level being lower than a battery level threshold, that the terminal device is out-of-battery;
   determining, in response to current battery level in the current power consumption data being lower than the predicted battery level and a difference between the predicted battery level and the current battery level being greater than a predetermined threshold, that the terminal device has a battery anomaly; and
   determining, otherwise, that the terminal device has a hardware failure.

7. The method according to claim 6, wherein the prediction model for battery level is established by means of machine learning based on historical power consumption data of a plurality of reference terminal devices which have the same device type as the terminal device.

8. The method according to claim 6, wherein predicting a device failure based on the current power consumption data further comprises:
   prior to determining the predicted battery level:
      obtaining historical power consumption data of the terminal device; and
      modifying the prediction model based on the historical power consumption data of the terminal device;
   wherein the modified prediction model is used to determine the predicted battery level.

9. The method according to claim 6, wherein the power consumption data comprises a battery level, device usage time, and a device behavior pattern.

10. The method according to claim 9, wherein the device behavior pattern comprises at least one of: a current value in the predetermined time period, an amount of messages in the predetermined time period, and an amount of events in the predetermined time period.

11. A network exposure node, comprising:
    one or more processors; and
    one or more memories containing computer program codes executable by the one or more processors, the network exposure node being configured to:

receive, from a server, a request for subscribing to a monitoring report related to a device failure predicted for a terminal device that can be enabled by an operator node, the terminal device one of: a low power wide area (LPWA) device and a category-M1 (CAT-M1) device, the device failure comprising one of a battery anomaly, out-of-battery, and hardware failure, the request comprising a data structure "MonitoringEventSubscription" having an attribute "monitoringType" set to "predictedDeviceFailure", and the monitoring report comprising a data structure "MonitoringEventNotification" having a parameter "predictedDeviceFailure" in a data type "monitoringEventReports", the parameter "predictedDeviceFailure" being set to the predicted device failure;

transmit a monitoring request for subscribing to the monitoring report to the operator node;

receive the monitoring report indicating a predicted device failure for the terminal device from the operator node; and transmit the monitoring report to the server.

12. An operator node, comprising:

one or more processors; and one or more memories containing computer program codes executable by the one or more processors, the operator node being configured to:

receive, from a network exposure node, a request for subscribing to a monitoring report related to a device failure predicted for a terminal device, the terminal device one of: a low power wide area (LPWA) device and a category-M1 (CAT-M1) device, the device failure comprising one of a battery anomaly, out-of-battery, and hardware failure, the request comprising a data structure "MonitoringEventSubscription" having an attribute "monitoringType" set to "predictedDeviceFailure", and the monitoring report comprising a data structure "MonitoringEventNotification" having a parameter "predictedDeviceFailure" in a data type "monitoringEventReports", the parameter "predictedDeviceFailure" being set to the predicted device failure;

obtain traffic data and current power consumption data of the terminal device;

detect, based on the traffic data, a traffic anomaly of the terminal device;

predict, in response to the detection of the traffic anomaly of the terminal device, a device failure based on the current power consumption data; and transmit the monitoring report indicating the predicted device failure to the network exposure node.

13. The operator node according to claim 12, wherein the operator node is configured to detect a traffic anomaly of the terminal device by:

checking, based on the traffic data, whether the terminal device operates in a normal traffic pattern; and determining, in response to the terminal device not operating in the normal traffic pattern, the traffic anomaly of the terminal device.

14. The operator node according to claim 13, wherein the operator node is further configured to generate the normal traffic pattern by means of machine learning based on historical traffic data of a plurality of reference terminal devices which have the same device type as the terminal device.

* * * * *